United States Patent
Delanoe et al.

(10) Patent No.: US 10,790,697 B2
(45) Date of Patent: Sep. 29, 2020

(54) SYSTEM FOR CONVERTING ELECTRICAL ENERGY SUPPLIED BY A NETWORK AND A CONVERSION METHOD IMPLEMENTED BY MEANS OF SUCH A CONVERSION SYSTEM

(71) Applicant: GE Energy Power Conversion Technology Limited, Warwickshire (GB)

(72) Inventors: Jérôme Delanoe, Belfort (FR); Emmanuel Leleu, Chalonvillars (FR)

(73) Assignee: GE ENERGY POWER CONVERSION TECHNOLOGY LIMITED, Warwickshire (GB)

(*) Notice: Subject to any disclaimer, the term of this patent is extended or adjusted under 35 U.S.C. 154(b) by 0 days.

(21) Appl. No.: 15/616,042

(22) Filed: Jun. 7, 2017

(65) Prior Publication Data
US 2017/0353049 A1   Dec. 7, 2017

(30) Foreign Application Priority Data

Jun. 7, 2016 (EP) .................................. 16305662

(51) Int. Cl.
*H02J 9/06* (2006.01)
*H02M 5/40* (2006.01)
(Continued)

(52) U.S. Cl.
CPC ............. *H02J 9/06* (2013.01); *H01F 27/306* (2013.01); *H02J 3/14* (2013.01); *H02M 3/24* (2013.01);
(Continued)

(58) Field of Classification Search
CPC . H01F 27/306; H02J 3/14; H02J 9/06; H02M 3/24; H02M 7/219; H02M 7/4826
See application file for complete search history.

(56) References Cited

U.S. PATENT DOCUMENTS 3,431,483 A * 3/1969 Lafuze .................. H02M 5/272
327/141
5,446,642 A * 8/1995 McMurray ............ H01F 27/385
307/105
(Continued)

FOREIGN PATENT DOCUMENTS

CN        200950540 Y      9/2007
CN        102280888 A     12/2011
(Continued)

OTHER PUBLICATIONS

Chaghi, A., et al., "Four legged active power filter compensation for a utility distribution system," Journal of Electrical Engineering, vol. 55, No. 1-2, pp. 31-35 (2004).
(Continued)

*Primary Examiner* — Thienvu V Tran
*Assistant Examiner* — Bart Iliya
(74) *Attorney, Agent, or Firm* — Wood IP LLC (57) ABSTRACT

This system for converting the electrical energy delivered by a supply network comprises of: a converter and at least one zero-sequence current limiting stage flowing in the converter. The or each limiting stage comprises an active compensation circuit comprising a magnetic component and a voltage source connected to the magnetic component, the voltage source and the magnetic component being adapted to serially inject with the converter an active compensation voltage of the zero-sequence voltages generated by the converter.

14 Claims, 9 Drawing Sheets

(51) Int. Cl.
*H02M 3/24* (2006.01)
*H02M 7/219* (2006.01)
*H02J 3/14* (2006.01)
*H01F 27/30* (2006.01)
*H02M 7/48* (2007.01)
*H02M 1/12* (2006.01)

(52) U.S. Cl.
CPC .............. *H02M 5/40* (2013.01); *H02M 7/219* (2013.01); *H02M 7/4826* (2013.01); *H02M 2001/123* (2013.01)

(56) References Cited

U.S. PATENT DOCUMENTS

| | | | |
|---|---|---|---|
| 5,831,842 A | | 11/1998 | Ogasawara et al. |
| 5,903,066 A | * | 5/1999 | Enjeti ................. H02M 1/4216 307/105 |
| 9,130,542 B1 | | 9/2015 | Ishihara et al. |
| 2010/0165678 A1 | * | 7/2010 | Costan ................. H02M 7/493 363/71 |
| 2010/0315187 A1 | * | 12/2010 | Laboure ................. H01F 30/12 336/12 |
| 2012/0106210 A1 | * | 5/2012 | Xu ............................ H02P 9/02 363/37 |
| 2013/0010506 A1 | * | 1/2013 | Sakai ...................... H02M 1/15 363/37 |
| 2013/0342138 A1 | * | 12/2013 | Permuy .................. H02M 5/42 318/400.3 |
| 2014/0021937 A1 | * | 1/2014 | Wang ...................... H02M 5/02 323/361 |
| 2014/0035498 A1 | * | 2/2014 | Harbourt ................. H02P 6/14 318/400.26 |
| 2015/0008859 A1 | * | 1/2015 | Inoue .................... H02M 7/483 318/496 |
| 2016/0329705 A1 | | 11/2016 | Lacaux et al. |
| 2017/0077746 A1 | * | 3/2017 | Kanakasabai ........... H02J 9/061 |

FOREIGN PATENT DOCUMENTS

| | | |
|---|---|---|
| CN | 102355139 A | 2/2012 |
| CN | 104078195 A | 10/2014 |
| CN | 104638963 A | 5/2015 |
| EP | 2 202 875 A1 | 6/2010 |
| EP | 2 744 101 A1 | 6/2014 |
| EP | 2 413 485 B1 | 1/2015 |
| EP | 2 887 519 A2 | 6/2015 |
| JP | 2004-357447 A | 12/2004 |
| JP | 2010-057268 A | 3/2010 |
| WO | 2015/108614 A1 | 7/2015 |

OTHER PUBLICATIONS

Neacsu, D. O., et al., "Limiting interconverter zero-sequence currents within 3-phase multi-converter power systems-review and ultimate solution," The 27th Annual Conference of the IEEE Industrial Electronics Society, vol. 2, pp. 1255-1261 (Nov. 29-Dec. 2, 2001) (Abstract).

Ye, Z., et al., "Control of circulating current in two parallel Three-Phase boost rectifiers," IEEE Transactions on Power Electronics, vol. 17, Issue 5, pp. 609-615 (Nov. 7, 2002).

Extended European Search Report and Opinion issued in connection with corresponding EP Application No. 16305662.5 dated Dec. 9, 2016.

\* cited by examiner

Iht: common mode current

SYSTEM FOR CONVERTING ELECTRICAL ENERGY SUPPLIED BY A NETWORK AND A CONVERSION METHOD IMPLEMENTED BY MEANS OF SUCH A CONVERSION SYSTEM

BACKGROUND TO THE INVENTION

In electrotechnical systems supplied from power systems using voltage inverters, zero-sequence currents are generated due to the control strategy of the inverters, which induce common-mode disturbances in the systems, in particular overvoltages in the machines, electrical disturbances, electromagnetic disturbances limiting the electromagnetic compatibility (EMC) of the devices, disturbances in the supply network, in the context of a system directly connected without a transformer between the network and the system, etc.

These zero-sequence currents flow in the first place toward the ground, flowing in a loop passing through the voltage inverters, the parasitic capacitances of the system, such as the parasitic capacitances of the rotating machines and/or the cables, and the ground.

Limiting the zero-sequence currents may be modified by the regulation of the converter by prohibiting certain switching states. Zero-sequence currents are further eliminated using a common-mode current limiting circuit. Such a circuit comprises primary electromagnetic windings connected between a rectifier and an inverter of the converter, a magnetic coupling core of the primary windings, and a secondary winding connected serially with a damping resistor and associated with a second magnetic coupling core of the secondary winding with the primary windings.

BRIEF DESCRIPTION OF THE INVENTION

Although the above referenced solution is advantageous in many respects, it does not make it possible to compensate for various types of zero-sequence flow currents and only allows the compensation of the zero-sequence current flowing to the ground, according to a loop passing through the voltage inverters and the parasitic capacitances of the system.

In fact, it is often desirable to use voltage inverters connected in parallel in order to allow the converter to handle higher currents and this, and with a reduced size.

When the voltage inverters are connected in parallel, three types of zero-sequence flow currents may arise.

These are, first of all, the inter-inverter zero-sequence flow current which arises due to the interlacing of the voltages. This current is intrinsic to the operation of the system and the number of zero-sequence current flow loops increases in proportion to the number of inverters in parallel.

Secondly, there is the parasitic inter-inverter zero-sequence flow, which is due to an inaccuracy of the various physical quantities used for controlling the constituent parts of the converter. There may, for example, be synchronization errors or an inaccuracy errors in the commands of the converters. These parasitic zero-sequence currents flow along the same paths as the inter-inverter zero-sequence currents resulting from the interlacing of the voltages.

Lastly, there is the zero-sequence flow current to ground mentioned above.

Figure 1:
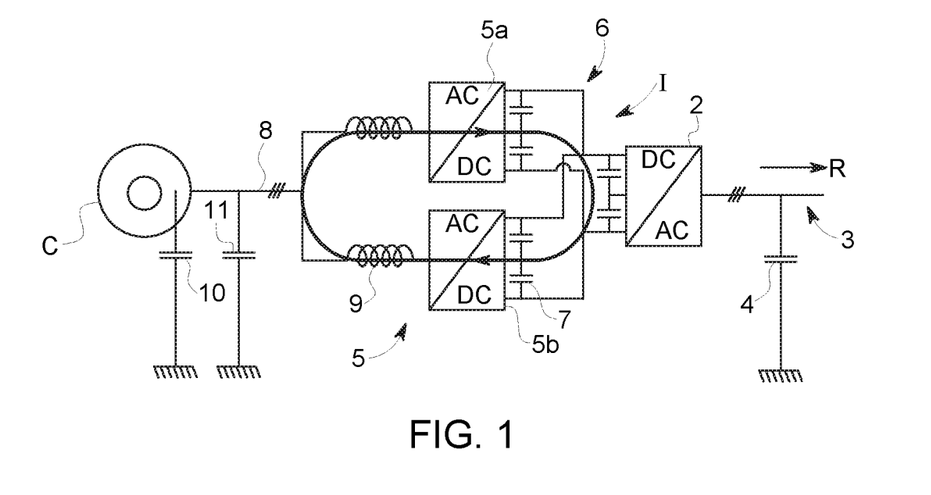
FIGS. 1, 2, and 3, which have already been mentioned, are diagrams illustrating the flow of zero-sequence currents in a conventional supply system.
Figure 2:
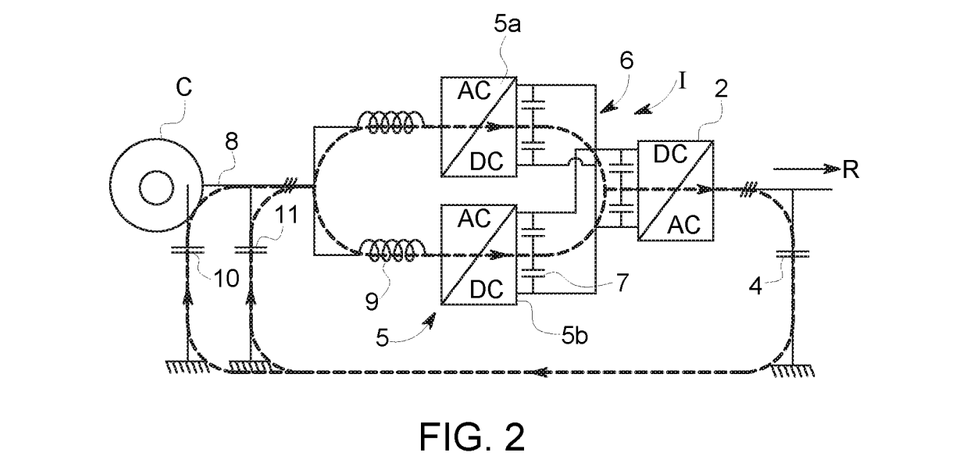
Figure 3:
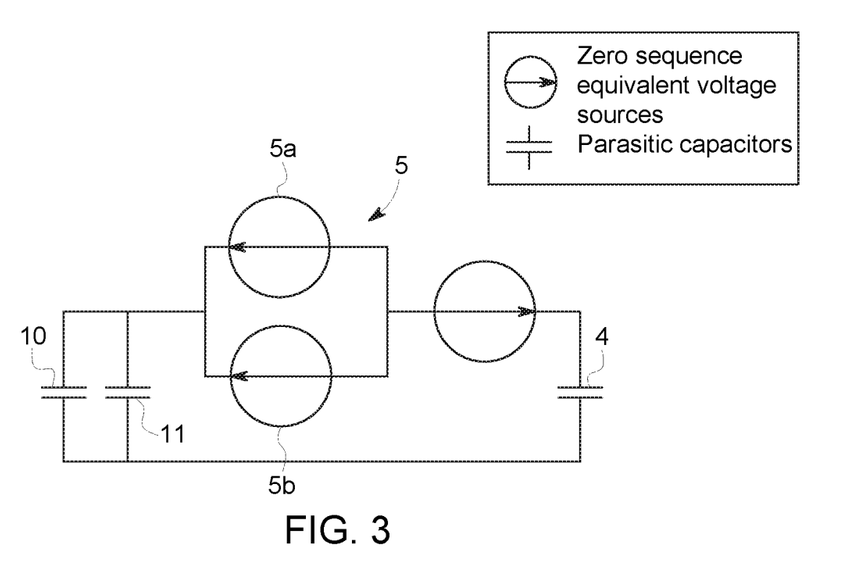

FIGS. 1 and 2 show an example of an electrotechnical structure for the electrical supply of a load C in which these types of zero-sequence currents are liable to arise, and FIG. 3 shows the zero-sequence equivalent diagram of the structure of FIGS. 1 and 2.

The electrotechnical structure of FIGS. 1 and 2 comprises a converter 1 connected between an AC supply network R and the load C and comprising a controlled rectifier 2, also referred to as AFE for "Active Front End", connected to the supply network by a cable 3, schematically represented by its parasitic capacitance 4, and an inverter stage 5 comprising a plurality of inverters 5a and 5b connected in parallel to the rectifier 2 by a DC bus 6 provided with capacitors, such as 7, and to the load C by a supply cable 8 by way of coupling inductors 9. The load C and the supply cable 8 are represented here by their respective parasitic capacitances 10 and 11.

As indicated above, due to the parallel connection of the inverters 5a and 5b, a zero-sequence inter-inverter current Ihi, if there is interlacing of the voltages, and a zero-sequence inter-inverter current Ihip flow in a loop between the inverters, the DC bus and the coupling inductors 9 (FIG. 1).

Similarly, a zero-sequence ground current Iht flows in a loop between the inverters, the rectifier and the various parasitic capacitances of the cables and the load, and the ground (FIG. 2).

Referring to the zero-sequence equivalent diagram of FIG. 3, in which only the principal impedances were preserved and in which the zero-sequence voltages of the inverters and the rectifier are represented by single-phase voltage sources, it appears that the zero-sequence voltage sources are connected in parallel and are not separated by any impedance, which causes the occurrence of a theoretically unlimited flow current. It should also be noted that most of the resulting zero-sequence voltage is found in the parasitic capacitances of the loads and the cables, which generates high dielectric stresses.

We can also refer to a bidirectional power converter for an electrical power distribution system comprising converter circuits connected in parallel to enable high current levels and consequently high electrical power levels to be obtained.

The undesirable flow currents in the low-frequency converters are suppressed by means of a zero-sequence controller which keeps the mean value of the flow current at zero using coupling inductors or proportional-integral type control circuits.

However, the solution described in this document is also no longer suited to eliminating the different types of zero-sequence currents flowing in the converter.

An aspect of embodiments of the invention is therefore to overcome the above-mentioned various disadvantages and to propose a system for supplying an AC load capable of eliminating the different types of zero-sequence currents likely to flow through the supply system regardless of its configuration.

BRIEF DESCRIPTION OF THE DRAWINGS

Other characteristics and advantages of the invention will become apparent on reading the following description, given solely by way of non-limiting example, with reference to the accompanying drawings, in which.

DETAILED DESCRIPTION OF THE INVENTION

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The following description applies in a non-limiting manner to a power source for an AC load.

In these various embodiments, the active compensation circuit comprises a magnetic component associated with a voltage source for generating a zero-sequence magnetic flux capable of generating an active compensation voltage of the zero-sequence components conveyed in the zero-sequence current flow loops Iht and inter-inverter flow loops Ihi and Ihip.

As shown in these figures, the magnetic component is made in the form of a coil wound around a magnetic core magnetically coupled to the other windings of the component connected to the converters of the electrotechnical structure so as to generate a magnetic flux F1 opposing the flux F2 creating the zero-sequence currents flowing in the converter.

Figure 4:
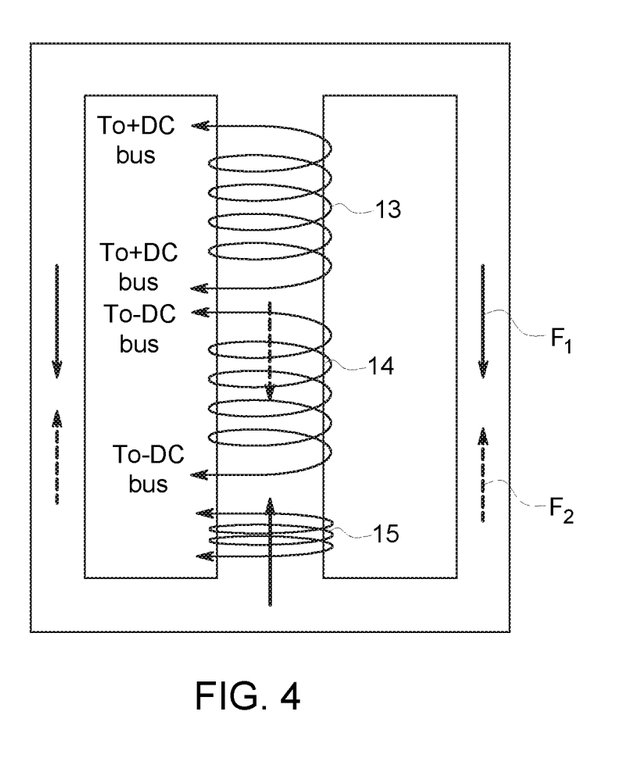
FIGS. 4, 5, and 6 illustrate various embodiments of a magnetic circuit used for the active compensation of zero-sequence voltages, for an electrical energy conversion system.

In the embodiment of FIG. 4, the electrical component consists of a single-phase tertiary transformer, comprising a common core 12 on which are wound two concentric windings 13 and 14 respectively connected to the positive and negative poles of a DC bus, and an additional coil wound around the same magnetic core 12 and to the terminals of which an auxiliary voltage source (not shown in this figure) is connected to actively cancel the zero-sequence components of the current flowing in the ground flow loops and inter-inverter loops.

Figure 5:
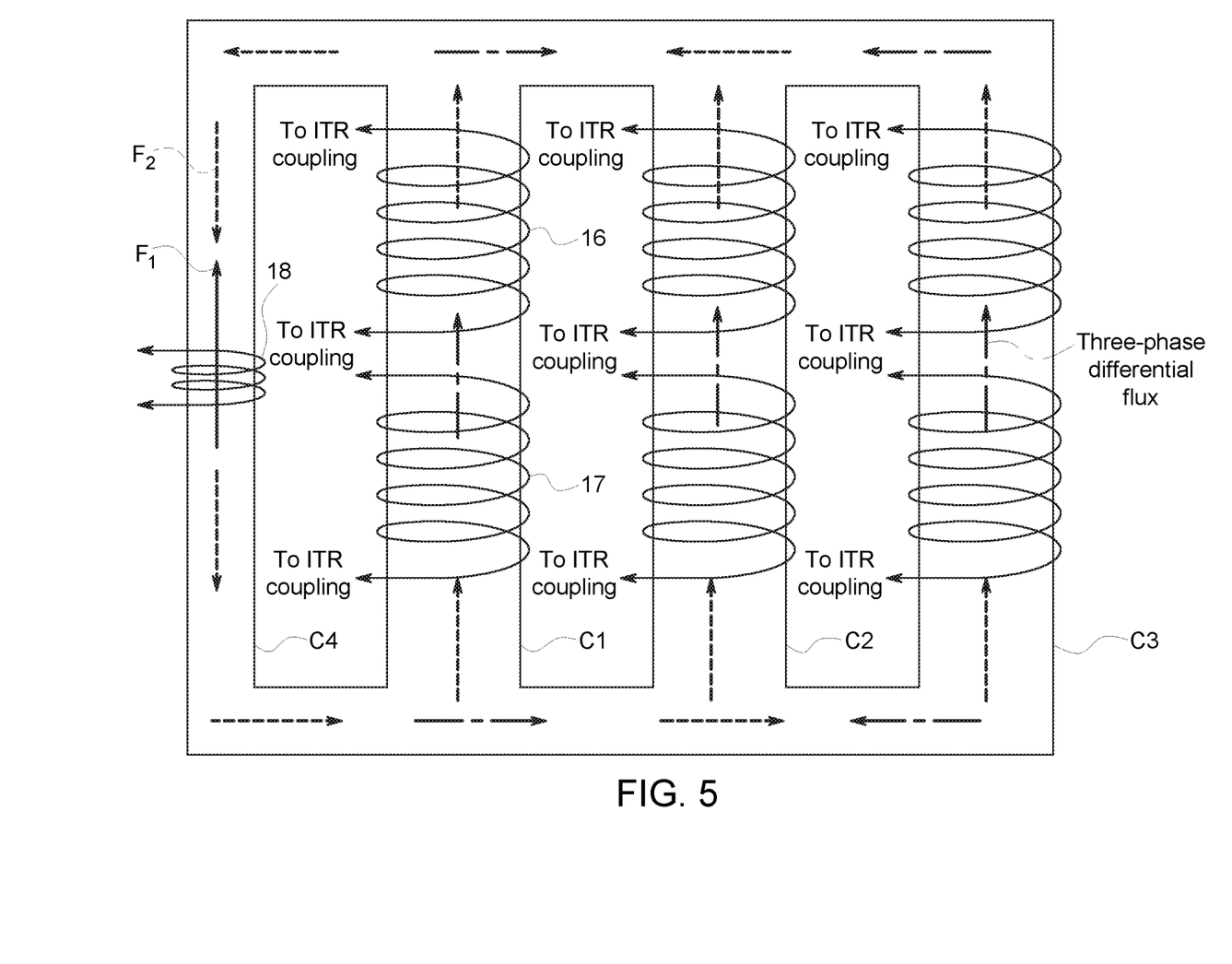

In the embodiment of FIG. 5, the electrical component consists of a three-phase interphase transformer comprising a magnetic core comprising three columns C1, C2 and C3, on each of which are wound two concentric coils, such as 16 and 17, and comprising a magnetic flux return column C4 around which is wound a coil 18 connected to an auxiliary voltage source. The voltage is selected so as to generate a flow F1 opposing the zero-sequence flux F2 generating the zero-sequence components in the converter.

Figure 6:
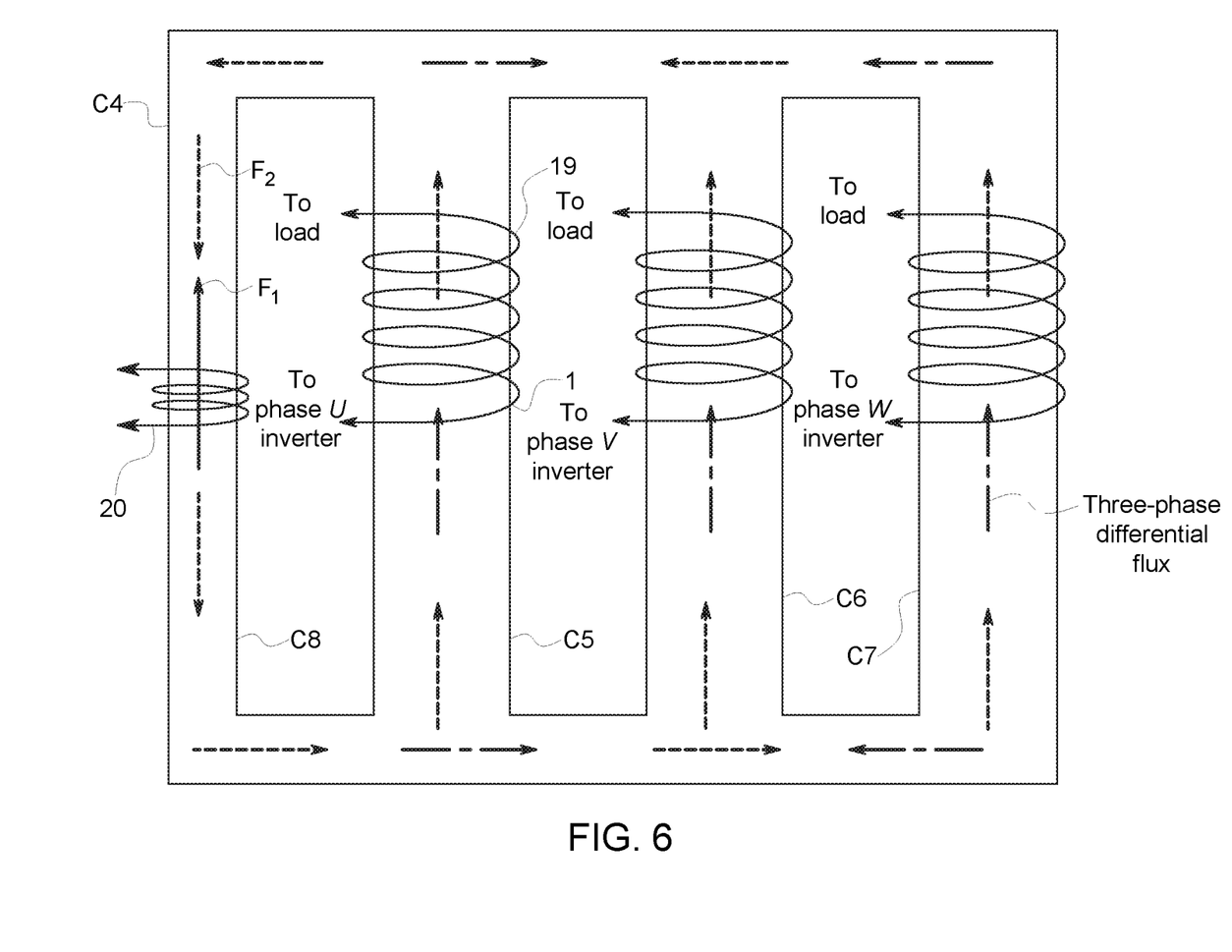

In the embodiment of FIG. 6, the electrical component consists of a three-phase inductive element also comprising a magnetic core provided with three columns C5, C6 and C7 around which a coil 19 is wound and a magnetic flux return column C8 comprising a coil 20 connected to a voltage source suitable for generating a magnetic flux F1 in the magnetic core opposing the zero-sequence flux F2 creating the zero-sequence currents.

In these various embodiments, the voltage sources are controlled so that the three types of zero-sequence flow current are cancelled or limited by the voltage then injected by the auxiliary sources connected to the additional windings 15, 20 and 18. As will be described in detail hereinafter, when such an active compensation circuit is inserted into a converter of a system for supplying a load, the cancellation of the zero-sequence flow currents may have the effect of being able to retain the advantages associated with the generation of zero-sequence components by inverters, as well as the advantages of interleaving the voltages of the various inverters in parallel, while protecting the loads and cables from overvoltages, protecting the inverters against thermal overloads and preventing the saturation of the magnetic components responsible for limiting the zero-sequence currents, including the low-frequency components.

Figure 7:
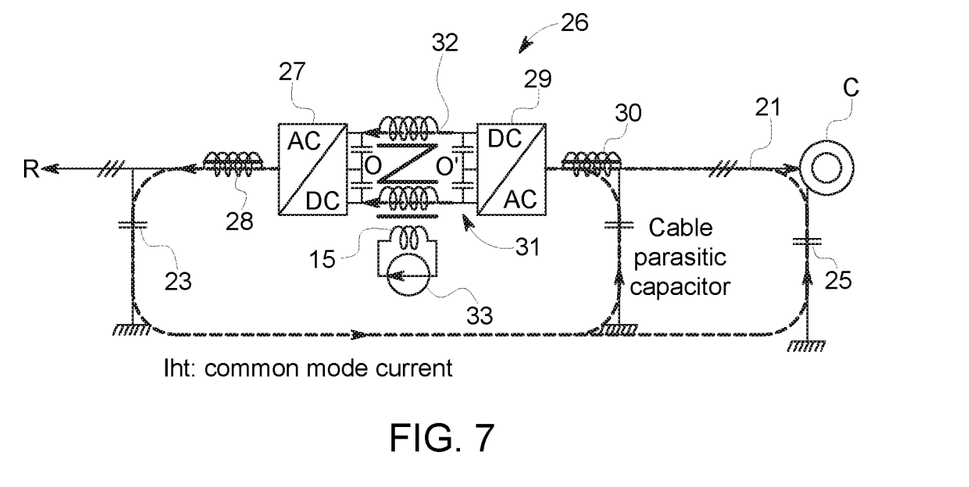
FIG. 7 illustrates an exemplary embodiment of a system for supplying an AC load, comprising an architecture having a single inverter and a single rectifier, and based on the use of a single-phase transformer for the serial active compensation of the zero-sequence components.
Figure 8:
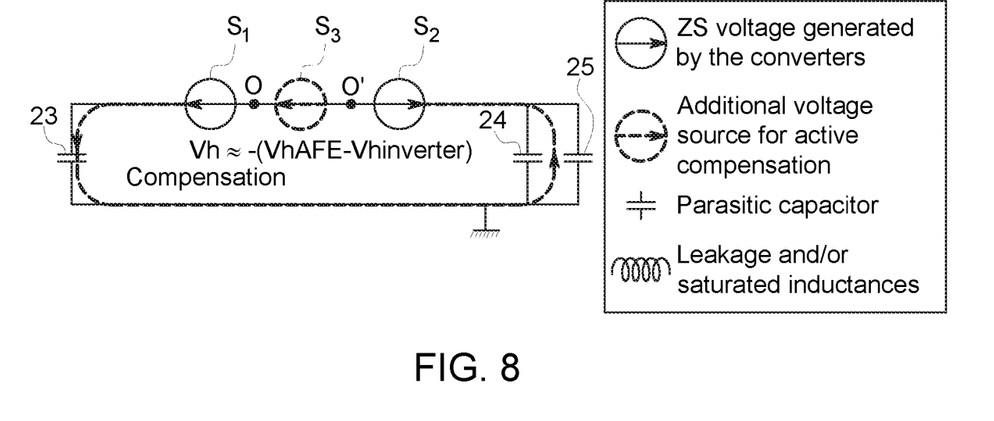
FIG. 8 shows the simplified equivalent zero-sequence diagram of the system described in FIG. 7.

Reference is now made to FIGS. 7 and 8, which illustrate a first embodiment of a system for supplying an AC load using an active compensation component made from a single-phase tertiary transformer.

In this figure, we recognize the load C supplied by an AC supply network R by means of three-phase supply cables 21.

In these two figures, the impedance of the cables and the load were represented by their parasitic capacitances 23, 24 and 25.

The supply system illustrated in this figure also includes a converter 26 comprising a rectifier stage 27 connected to the network R by a line inductor 28, an inverter stage 29 connected to the supply cable 21 of the load C via a line inductor 30 and a DC bus 31 connecting the two stages 27 and 29 of the converter 26.

In this embodiment, the converter 26 comprises a single rectifier and a single inverter connected by the same DC bus.

The zero-sequence current is compensated here by using a single-phase tertiary transformer 32 such as that described above with reference to FIG. 4 and connected to compensation voltage source 33 connected to the terminals of the coil 15.

The equivalent zero-sequence diagram of the circuit of FIG. 7 is illustrated in FIG. 8 in which only the essential impedances of the circuit were preserved and in which the inverter and the rectifier are shown schematically by single-phase voltage sources S1 and S2 respectively.

As can be seen, the active compensation circuit constitutes a source S3 of serial active compensation voltage of the zero-sequence voltages generated by the converter.

Figure 9:
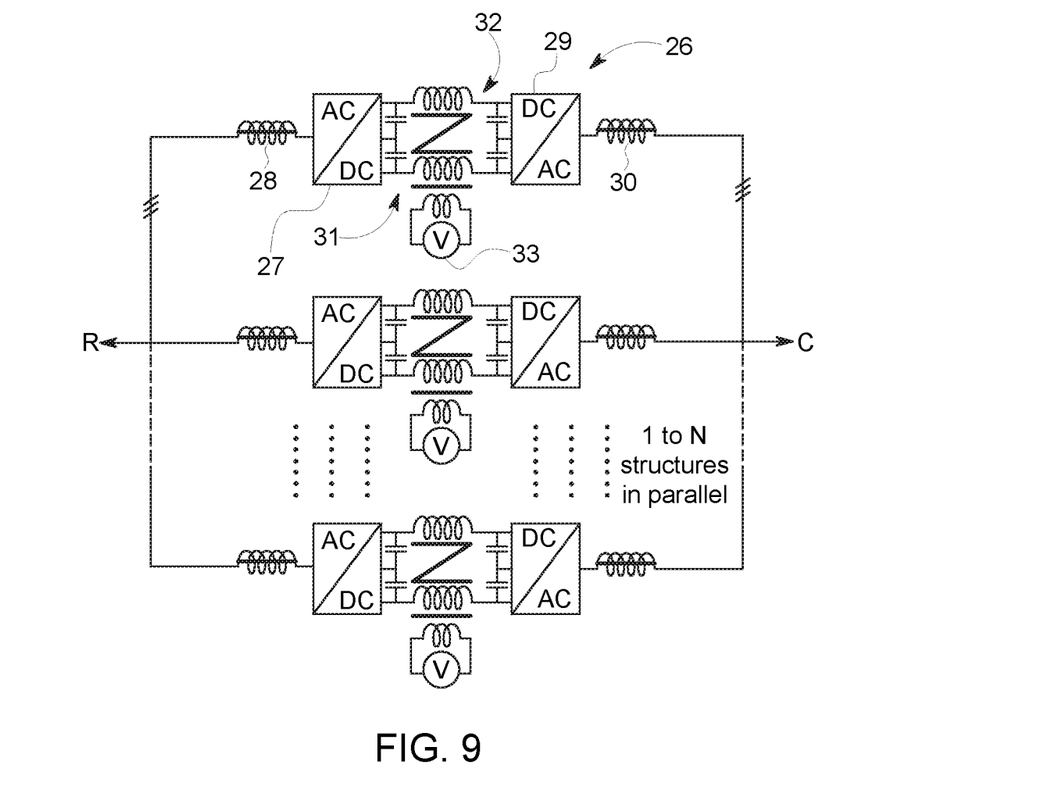
FIG. 9 illustrates a variant of the supply system of FIG. 7, comprising a converter having a structure with a plurality of inverters and rectifiers in parallel.

In the embodiment of FIG. 7, the converter comprises a single rectifier 27 associated with a single inverter 29 via a single DC bus 31 provided with a single-phase transformer 32. With reference to FIG. 9, it is also possible, alternatively, to implement the converter in the form of a plurality of branches in parallel, each having a structure identical to that described previously with reference to FIG. 7 and each connected to the network and to the load via line inductors (or a three-phase interphase transformer) 28 and 30.

Figure 10:
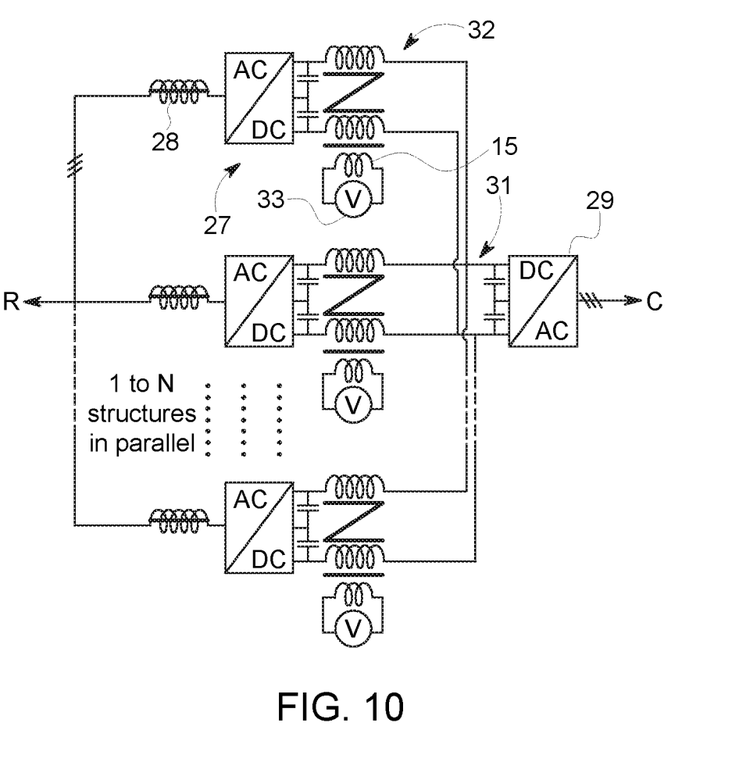
FIG. 10 illustrates another variant of the supply system of FIG. 9, having a common DC bus.

According to another structure visible in FIG. 10, the converter comprises a common DC bus 31 associated with a single inverter 29 and a plurality of rectifiers 27 connected in parallel, each associated with a single-phase transformer 32 provided with a coil 15 connected to a voltage source 33.

Figure 11:
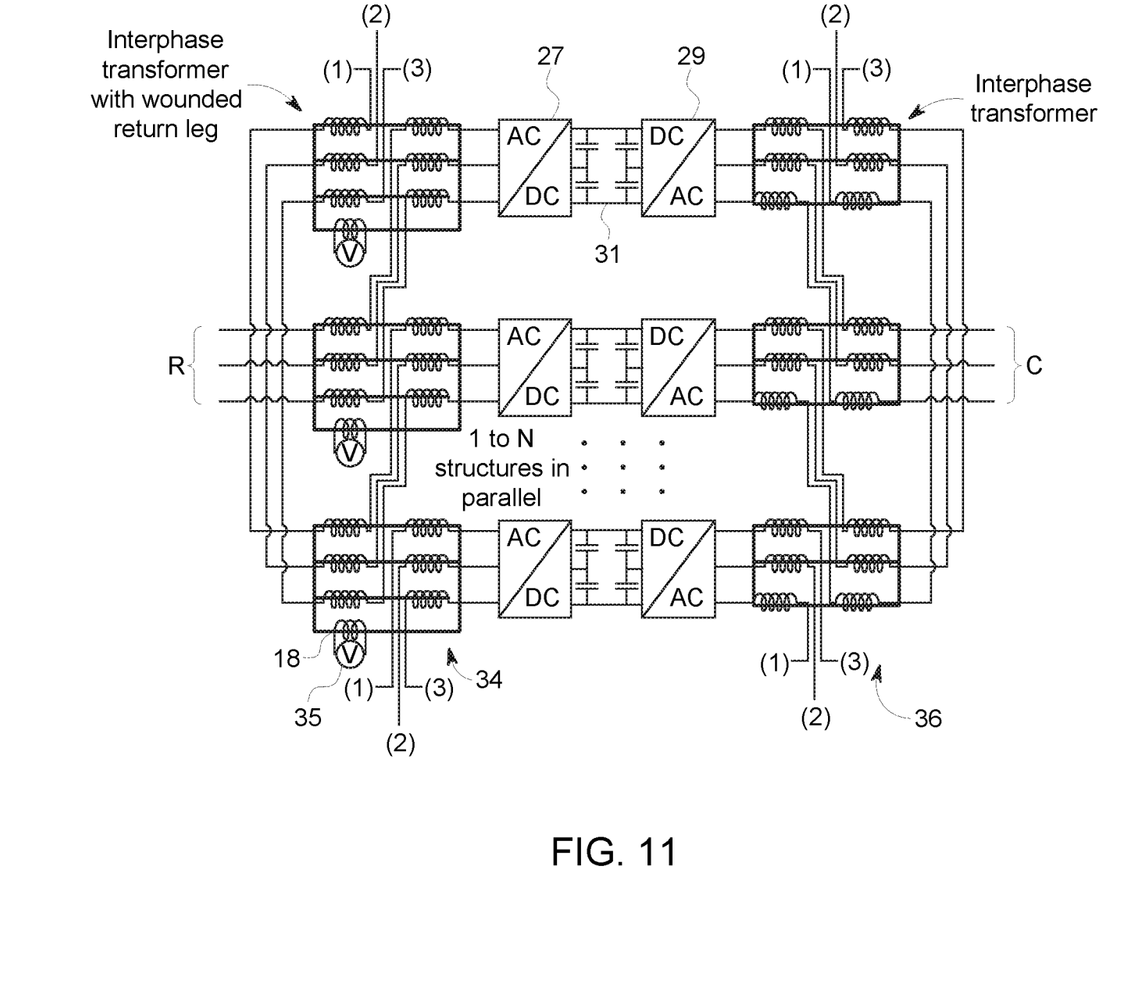
FIG. 11 illustrates another embodiment of a supply system of a load, using three-phase interphase transformers and having independent DC buses.

According to another embodiment illustrated in FIG. 11, the converter of the supply system comprises a plurality of branches connected in parallel, each comprising a rectifier 27 and an inverter 29 connected by a DC bus such that the DC buses of the parallel branches are here independent.

In this embodiment, the converter is connected to the load, on the one hand, and to the network, on the other hand, using a three-phase interphase transformer with a coiled return column 34, identical to that described above with reference to FIG. 5 and comprising a coil 18 connected to a voltage source 35 capable of cancelling the zero-sequence components flowing into the converter and by an interphase transformer 36 without a magnetic return column.

Figure 12:
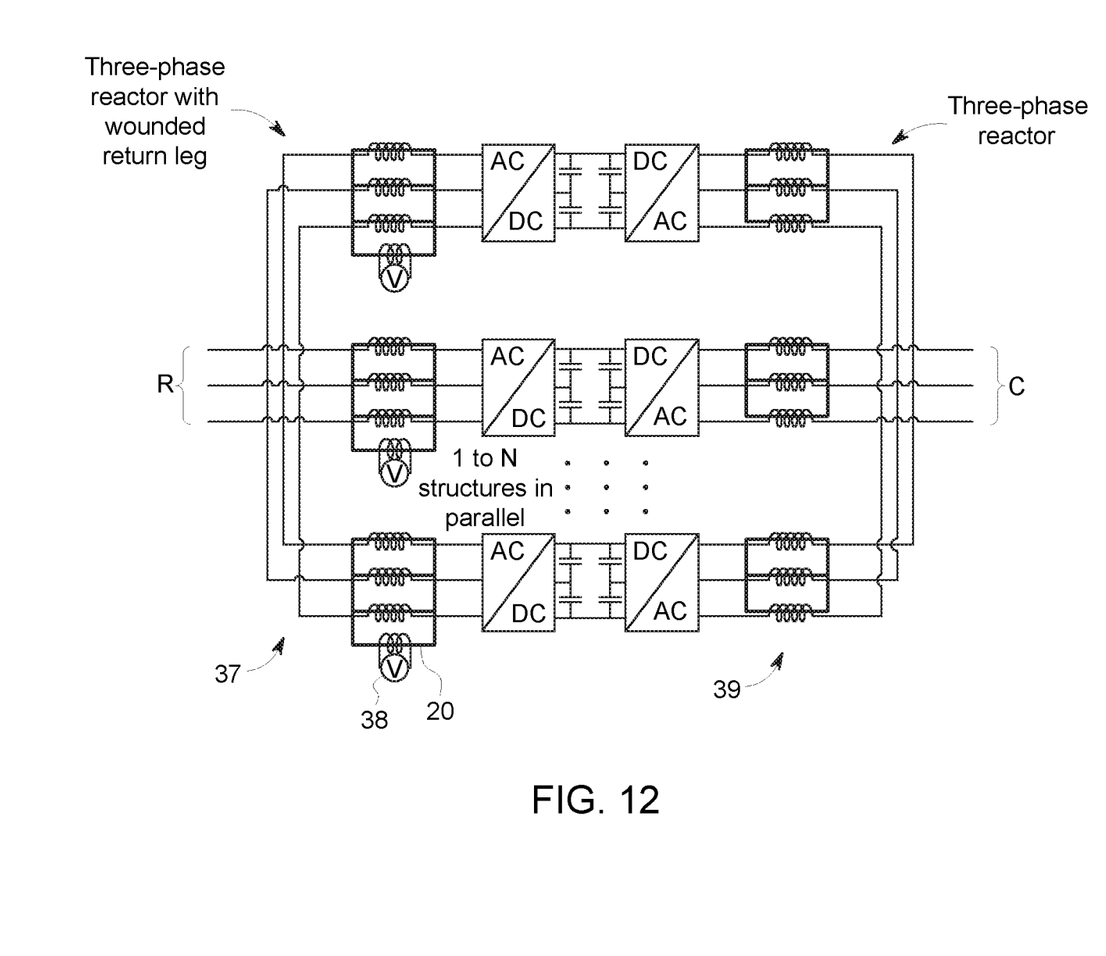
FIG. 12 illustrates a third embodiment of a supply system of a load, using three-phase inductive elements and having independent DC buses.

Finally, with reference to FIG. 12, in another embodiment, the converter, which also comprises a plurality of branches in parallel, each comprising a rectifier 27 and an inverter 29 connected by a DC bus 31, is connected to the network, on the one hand, and to the load, on the other hand, using a three-phase inductive element 37 identical to the component described previously with reference to FIG. 6 and comprising a coil 20 associated with a voltage source 38 and by three-phase inductive elements 39 without a magnetic return column.

As designed, embodiments of the invention, which uses an active compensation circuit comprising a coil associated with a voltage source, makes it possible to inject serially with the converters a voltage cancelling the ground and inter-inverter zero-sequence currents. In this respect, the voltage source can be controlled from a measurement of the components to be cancelled.

It should be noted that embodiments of the invention just described allow the creation of certain electrotechnical topologies which could not be implemented due to the presence of parasitic frequency-based zero-sequence currents that saturate certain types of magnetic components.

The supply system just described can be used by using low-voltage auxiliary voltage sources by appropriate adjustment of the transformation ratio of the various coils associated with the active compensation circuit, wherein the low-voltage sources are cheaper and easier to implement.

It should also be noted that embodiments of the invention allows an optimization of the magnetic components thanks to the active compensation of the zero-sequence fluxes in their core. The magnetic components then become less heavy and consequently less expensive, wherein the majority of the zero-sequence fluxes are cancelled and no longer magnetize the core.

In an embodiment, in order to limit the power of the auxiliary voltage source, only the low-frequency components of the zero-sequence currents Ihip can be compensated, wherein the impedance of the zero-sequence inductors, in particular that of the single-phase or three-phase transformers or inductive elements of the converter then serve to limit the higher-frequency zero-sequence currents.

It is also conceivable that the active limiting component and the electrical component providing the differential coupling function for the interlacing or coupling of the voltage sources can be created from a common structure. In fact, the winding of the active component is wound around the same core as that of the single-phase transformers or three-phase interphase transformers or three-phase inductive elements, in particular thanks to the presence of the coiled return column, which allows a gain in terms of volume, weight, efficiency and cost, since the same component allows the coupling or interlacing of the voltages of the inverter and the limitation of the zero-sequence flow currents.

Moreover, the active compensation of the zero-sequence current makes it possible to reduce the necessary minimum impedance of the magnetic components and thus to insert more air gaps between them, which may have the advantage of increasing the linearity of the component and hence the robustness of the system.

When the supply system is coupled to the network without using a transformer, the active compensation reduces the additional grounding capacity and thus reduces the capacitive fault currents to the ground generated in the event of a fault between the phase and the ground of the supply network.

Finally, it should be noted that embodiments of the invention just described makes it possible to use common strategies for adding zero-sequence voltage to power converters controlled by pulse width modulation (PWM), since this zero-sequence voltage is compensated for by the active compensation system. These strategies make it possible to optimize in particular the losses of the converters, as well as the heating and sizing, and in particular the efficiency losses induced by the addition of the equipment necessary for the active compensation and thus this equipment does not result in any additional loss in terms of the total losses of the converter.

An aspect of an embodiment of the invention is a system for converting the electrical energy delivered by a supply network, comprising a converter and at least one zero-sequence current limiting stage flowing in the converter.

The or each limiting stage comprises an active compensation circuit comprising a magnetic component and a voltage source connected to the magnetic component, the voltage source and the magnetic component being adapted to serially inject an active compensation voltage of the zero-sequence voltages generated by the converter.

This compensation voltage opposes the zero-sequence voltage sources of the converters with the consequence of limiting the various zero-sequence currents mentioned above.

It is thus possible to limit all types of zero-sequence currents, both the currents flowing between the inverters connected in parallel and the ground currents flowing through the parasitic capacitances.

It is also possible to limit the zero-sequence currents, both at high frequency and at low frequency.

According to another characteristic of this supply system, the compensation circuit comprises a coil wound around a magnetic core and connected to the voltage source.

In one embodiment, the converter comprises an inverter stage comprising a set of at least one inverter connected in parallel to a DC bus connected to the output of the rectifier stage and capable of converting the direct current supplied by the rectifier stage.

In one embodiment, the active compensation circuit comprises a single-phase transformer connected to each pole of the DC bus between the inverter stage and the rectifier stage and equipped with the active compensation circuit.

The active compensation circuit can be formed by a tertiary winding of the single-phase transformer magnetically coupled to the primary and secondary windings of the transformer.

The supply system may further include a line inductor connected to the alternating side of at least one of the inverter and rectifier stages.

The supply system may further include an interphase transformer connected to the alternating side of at least one of the inverter and rectifier stages.

In another embodiment, in which the converter comprises a set of parallel branches each comprising an inverter stage and a rectifier stage, the active compensation circuit comprises three-phase interphase transformers making it possible to connect in parallel the parallel branches of the converter and each comprising a magnetic flux return column equipped with the active compensation circuit.

The active compensation circuit can thus comprise a winding connected to the voltage source and wound around the magnetic flux return column.

In one embodiment, the converter comprises a set of parallel branches each comprising an inverter stage and a rectifier stage, wherein the active compensation circuit comprises an interphase transformer with a magnetic flux return column for each branch.

In one embodiment, in which the converter comprises a set of parallel branches each comprising an inverter stage and a rectifier stage, the supply system may further comprise a set of interphase transformers making it possible to connect in parallel the parallel branches of the converter, as opposed to the interphase transformers with magnetic return columns.

The conversion system may thus comprise a set of interphase transformers with magnetic flux return columns on one AC side of the system and without magnetic flux return columns on the other AC side.

In another embodiment, in which the converter comprises a set of parallel branches each comprising an inverter stage and a rectifier stage, the active compensation circuit comprises three-phase inductive elements adapted to connect in parallel the parallel branches of the converter and each comprising a magnetic flux return column equipped with the active compensation circuit.

The magnetic flux return column comprises a winding wound around the magnetic flux return column.

In one embodiment, the system comprises a set of parallel branches each comprising an inverter stage and a rectifier stage, wherein the active compensation circuit comprises a three-phase inductive element with a magnetic flux return column for each branch.

The supply system may further comprise a set of three-phase inductive elements making it possible to connect in parallel the parallel branches of the converter, as opposed to the three-phase inductive elements with magnetic flux return columns.

The object of an embodiment is also, in a second aspect, a method for converting the electrical energy delivered by a supply network by means of a converter connected to the supply network, in which the zero-sequence current flowing in the converter is reduced.

The zero-sequence current is reduced by serially injecting with the converter an active compensation voltage for the zero-sequence voltages, wherein the compensation voltage is provided by an active compensation circuit comprising a magnetic component and a voltage source connected to the magnetic component.

What is claimed is:

1. A system for converting electrical energy delivered by a supply network, comprising:

a converter comprising a rectifier stage and an inverter stage and configured to be connected to the supply network;

a DC bus disposed between an output of the rectifier stage and an input of the inverter stage and connecting the rectifier stage and the inverter stage together; and at least one zero-sequence current limiting stage flowing into the converter, wherein the at least one zero-sequence current limiting stage comprises an active compensation circuit disposed on the DC bus and connected between the output of the rectifier stage and the input of the inverter stage and the active compensation circuit comprising:

a single phase transformer disposed on the DC bus comprising a magnetic core including at least two windings connected to positive and negative poles of the DC bus and a separate magnetic component of the same magnetic core, and a compensation voltage source directly connected to the separate magnetic component of the single phase transformer, wherein the compensation voltage source is configured to: actively cancel zero-sequence components of any current flowing in ground flow loops and inter-inverter loops by injecting a voltage serially with the converter to generate a magnetic flux opposing a zero-sequence magnetic flux creating zero-sequence currents for the active compensation of zero-sequence voltages generated by the converter.

2. A conversion system according to claim 1, wherein the separate magnetic component being a magnetic flux return column of the magnetic core comprising a coil wound around the magnetic flux return column and the coil being directly connected to the compensation voltage source.

3. A system according to claim 1, wherein the inverter stage comprising a set of at least one inverter connected in parallel to a DC bus connected to the output of the rectifier stage and capable of converting the direct current supplied by the rectifier stage.

4. A conversion system according to claim 1, wherein the active compensation circuit is formed by a tertiary winding of the single-phase transformer magnetically coupled to the primary and secondary windings of the transformer.

5. A conversion system according to claim 1, further comprising a line inductor connected to the alternating side of at least one of the inverter and rectifier stages.

6. A conversion system according to claim 1, comprising an interphase transformer connected on the alternating side of at least one of the inverter and rectifier stages.

7. A conversion system according to claim 1, wherein the converter comprises:

a set of parallel branches each comprising the rectifier stage connected at the output thereof to the active compensation circuit comprising the single phase transformer adapted to connect, in parallel, the parallel branches of the converter and each comprising a magnetic flux return column equipped with the active compensation circuit; and the DC bus being a common bus wherein the inverter stage comprises a single inverter connected at the input thereof to the active compensation circuit of each branch of the parallel branches.

8. A conversion system according to claim 7, further comprising a winding connected to the voltage source and wound around the magnetic flux return column.

9. A conversion system comprising:

a converter comprising:

a set of parallel branches each comprising an inverter stage; and a rectifier stage comprising an active compensation circuit an input thereof, the active compensation circuit comprising:
   an interphase transformer comprising a magnetic core including at least two windings and a magnetic flux return column for each branch, and
   a compensation voltage source directly connected to the magnetic flux return column, wherein the compensation voltage source is configured to: actively cancel zero-sequence components of current flowing in ground flow loops and inter-inverter loops by injecting a voltage serially with the converter to generate a magnetic flux opposing a zero-sequence magnetic flux creating zero-sequence currents for the active compensation of zero-sequence voltages generated by the converter.

10. The conversion system according to claim 9,
   further comprising a set of interphase transformers adapted to connect in parallel the parallel branches of the inverter stages of the converter, as opposed to the interphase transformers with magnetic flux return columns at the input of the rectifier stage of each parallel branch.

11. A conversion system according to claim 10, further comprising:
   a set of three-phase inductive elements adapted to connect in parallel the parallel branches of the inverter stages of the converter, as opposed to the three-phase inductive elements with magnetic flux return columns at the input stage of the rectifier stage of each parallel branch.

12. A conversion system according to claim 9, wherein the interphase transformers are replaced with three-phase inductive elements adapted to connect in parallel the parallel branches of the converter and each comprising the magnetic flux return column.

13. A conversion system according to claim 12, wherein the magnetic flux return column comprises a winding wound around the magnetic flux return column.

14. A method of converting electrical supplied by a supply network, the method comprising:
   providing a converter comprising a rectifier stage and an inverter stage, connected to the supply network;
   disposing a DC bus between an output of the rectifier stage and an input of the inverter stage and connecting the rectifier stage and the inverter stage together;
   providing at least one zero-sequence current limiting stage flowing into the converter and comprising an active compensation circuit disposed on the DC bus and connected between the output of the rectifier stage and the input of the inverter stage and the active compensation circuit comprising: a single phase transformer disposed on the DC bus comprising a magnetic core including at least two windings connected to positive and negative poles of the DC bus and a separate magnetic component of the same magnetic core and a compensation voltage source directly connected to the magnetic component of the single phase transformer; and
   actively cancelling zero-sequence components of current flowing in ground flow loops and inter-inverter loops by injecting, via the compensation voltage source, voltage serially with the converter to generate a magnetic flux opposing a zero-sequence magnetic flux creating zero-sequence currents for active compensation of zero-sequence voltages generated by the converter; and
   reducing the zero-sequence current flowing in the converter.

* * * * *